United States Patent Office

3,280,057
Patented Oct. 18, 1966

3,280,057
WATER THINNED INDUSTRIAL BAKING ENAMELS COMPRISING AN ADDUCT OF AN ALKYLENE OXIDE AND A POLYHYDROXY COMPOUND CONTAINING AT LEAST THREE HYDROXYL GROUPS
Philip J. Campagna, Somerville, N.J., assignor to Allied Chemical Corporation, New York, N.Y., a corporation of New York
No Drawing. Filed Feb. 12, 1963, Ser. No. 257,860
10 Claims. (Cl. 260—21)

This invention relates to water-based coating compositions and more particularly to coating compositions which contain aqueous solutions of an oil-modified alkyd resin and an amine-aldehyde resin.

For many years the paint industry has sought a water-based paint which would be a suitable substitute for conventional organic solvent-based paints. Particular emphasis has been placed on development of a water-based baking enamel which would form hard, glossy, flexible films and thus be useful as a protective finish for automobiles, appliances and the like. Water-based paints are highly advantageous in that the fire hazard created by organic solvents is eliminated, the need for complex and costly exhaust equipment to remove disagreeable odors created by organic solvents is eliminated and the cost of the paint is reduced by the substitution of water for an organic solvent.

In addition to forming coatings which are hard, glossy and flexible, to be acceptable for industrial applications a water-based paint also must produce coatings which exhibit a high degree of resistance to water, alkali and common solvents. Furthermore, it is necessary that such a water-based paint be capable of being stored for extended periods of time i.e. weeks or even months without loss of stability.

Various attempts have been made by the art to produce a suitable water-based paint containing an alkyd resin. One well-known method of using water as a vehicle involves emulsification of an alkyd resin in water using common dispersing agents. However, conventional emulsion paints have been found unsatisfactory since they are stabilized with protective colloids such as casein, glue, gum arabic, starch or cellulose derivatives, all of which are subject to attack by various microbes and fungi; such attack having an adverse effect on film properties. Furthermore, the presence of such agent makes the film inherently more water-sensitive.

Recent developments in the art propose to produce a water-dispersible alkyd resin by heating a reaction mixture comprising polyethylene glycol and a polycarboxylic acid to esterifying temperature together with a polyhydric alcohol and a drying oil or the fatty acids thereof so as to produce a reaction product of low acid value. Baking enamels produced from alkyd resins prepared in this manner were found to possess inferior film properties and were not suitable for storage over an extended period of time.

Accordingly, it is an object of this invention to provide a stable, water-based coating composition suitable for storage over an extended period of time which contains a water-soluble, oil-modified alkyd resin.

Another object of the invention is to provide such a coating composition which also contains a water-soluble urea-triazine-aldehyde resin and is suitable for use as a baking enamel.

Another object of the invention is to provide such a baking enamel wherein films produced therefrom are resistant to water, flexible, hard and have a glossy appearance.

These and other objects and advantages will become apparent from the following detailed description.

It has now been discovered that water-based baking enamels having film properties comparable to organic solvent-based baking enamels can be prepared by forming an aqueous solution of the novel water-soluble, alkyd resin of the present invention and a water-soluble urea-triazine-aldehyde resin which is compatible with said alkyd resin as will herein later be described. The resulting water-thinned baking enamels form films that are hard, flexible, glossy and water resistant. In addition, these enamels are highly stable and suitable for storage over extended periods of time.

The novel alkyd resins of the present invention are of the oil-modified type and broadly comprise the reaction product of a polybasic acid, a polyhydric alcohol component, a glyceride oil or its fatty acids and a polyalkylene polyol which is the addition product of an alkylene oxide and a polyol having at least three hydroxyl groups. These resins are prepared in accordance with conventional practices wherein a polybasic acid, a polyhydric alcohol and the polyalkylene polyol are heated together with a glyceride oil derivative comprising the monoglycerides or the diglycerides of fatty acids or mixtures thereof. The oil-modified alkyd resins may also be formed starting with free fatty acids by either first reacting the fatty acids with glycerol to form the mono- or di glycerides and heating these partial esters with the other alkyd resin components or by mixing the fatty acids, glycerol and other alkyd resin components at the start and heating the mixture to the reaction temperature.

In preparing the novel alkyd resins of the present invention, it is necessary to take into account a number of factors relating either to the nature and proportions of the reactants employed or the extent of the reaction. The choice of reactants used, particularly the glyceride oil, depends upon the desired grade (e.g. primer or outer coating) or the ultimate use of the final product as will be discussed later. In formulating the alkyd resin, the main objective is to achieve a maximum degree of water-solubility of the polyesters, stability of aqueous coating compositions and water-resistance of cured coatings. However, a change in the formulation which improves one of these properties may seriously degrade another. Therefore, an important aspect of this invention is the determination of the proportion of reactants and the extent of the reaction which produces an optimum balance of these properties.

In accordance with the present invention oil-modified alkyd resins have been produced which provide a degree of water-solubility, stability and water-resistance never before attained in the art. These resins are formulated to gel at acid numbers of from about 20 to about 75, preferably 55 to 60. The esterification reaction is carried to within 10 to 20 acid units greater than the calculated gel point, thus producing resins having acid numbers of from about 40 to about 95, preferably about 60 to 75. When the esterification reaction has proceeded to a point wherein the resin has an acid number within the desired range, a fairly high viscosity is obtained. Specifically, a viscosity of about M to V as measured on the Gardner-Holdt scale should be obtained when a sample of the resin is diluted with 50 percent by weight of xylene.

The water-soluble alkyd resins of the present invention have a ratio of functional hydroxyl to carboxyl groups which ranges from 0.9 to 1.36 to one; preferably 0.9 to 1.1 to one. This relationship produces resins having hydroxyl numbers ranging from approximately 50 to approximately 130, preferably about 60 to about 80.

The oils which are useful in producing an oil-modified alkyd resin in accordance with this invention may be selected from any of the classes of drying semi-drying and non-drying oils. A partial list of useful oils includes soybean oil, linseed oil, cocoanut oil, sunflower seed oil, corn oil, castor oil, cottonseed oil, tung oil, tall oil, fish oils, isano-soya bean oil mixtures, tung-soya bean oil mixtures, oiticica-soya bean oil mixtures and dehydrated castor-soya bean oil mixtures. In addition, many fatty acids are useful including pelargonic, stearic, palmitic, lauric, tall oil acids and acids derivable from linseed oil, soya-bean oil and other fats and oils. The alkyd resins contain from about 1 to 45 and preferably 25 to 38 percent by weight of the total resin of the glyceride oil or its equivalent mono- or diglyceride. Such resins are ordinarily spoken of being 1 to 45 percent or 25 to 38 percent oil modified.

In choosing the particular oil or fatty acid used in producing the alkyd resin, consideration should be given to the nature of the baking enamel being produced. For example, if the combination is to be used as a primer coating, a low grade, inexpensive oil such as soya bean oil can be used. If the final product is to be used as an outer coating, a higher grade, more expensive oil such as cocoanut oil is preferred.

Any of the conventonal polybasic acids may be utilized in producing the alkyd resin of the present invention. Phthalic anhydride is the preferred and most commonly used polybasic acid; however any of the following may be substituted for part of the phthalic anhydride to modify the properties of the product; trimellitic, tetrahydrophthalic, hexahydrophthalic, isophthalic, succinic, adipic, sebacic and others. It is also to be understood that the anhydrides thereof, where one exists, are useful in the present invention. It may be desirable to add a small amount on the order of about 1.5 percent by weight of the total carboxylic acids present of an alpha-beta unsaturated dicarboxylic acid such as maleic or fumaric to promote some cross-linking and thus produce harder films and coatings. However, the alpha-beta dicarboxylic acid may be omitted if desired.

Any of the conventional polyols used in the production of alkyd resins may be utilized as the polyhydric alcohol component in the alkyd resin of the present invention. Examples of some of these conventional polyols include glycerol, ethylene glycol, propylene glycols, pentaerythritol, sorbitol, mannitol, butylene glycols, neopentyl glycol, diethylene glycols, triethylene glycols, dipropylene glycol, tripropylene glycol, trimethylolethane, trimethylolpropane and others. Mixtures of the polyhydric alcohols are often desirable and in the present invention it is preferred to use a mixture of pentaerythritol and propylene glycol in proportions calculated to be equivalent to glycerol. While the mixture of pentaerythritol and propylene glycol tends to produce better water-resistance in the ultimate film or coating, it is to be understood that satisfactory results are obtained with the use of other polyols or mixtures thereof.

The stability and water-solubility of the alkyd resin are improved in accordance with the present invention by additionally modifying the alkyd resin with a polyalkylene polyol which is the addition product of an alkylene oxide and an aliphatic polyol having at least three hydroxy groups per molecule. Suitable alkylene oxides include, for example, ethylene oxide, propylene oxide and butylene oxides. Suitable aliphatic polyols include, for example, glycerol, pentaerythritol, sorbitol, mannitol, trimethylolethane, trimethylolpropane and others. Polyalkylene polyols useful in the present invention have an average molecular weight of from 1100 to 9000. A polyalkylene polyol which produces particularly good stability in the final product comprises the addition product of equal mols of ethylene oxide and propylene oxide with glycerol and having an average molecular weight of from 1100 to 2600. The mol ratio of total oxides to glycerol may be between 10 and 25.

The polyalkylene polyol component is reacted with the glyceride oil, polybasic acid and polyhydric alcohol during esterification, thus building the polyalkylene polyol radical into the alkyd resin molecule in a similar manner throughout the whole range of different molecular weight species. The proportion of polyalkylene polyol component used in preparing the water-soluble alkyd resin can be varied widely. Particularly good results are obtained when the polyalkylene polyol is utilized in an amount of from about 5 to 12 percent by weight of the complete alkyd resin. Other proportions of polyalkylene glycol, for example as low as about 1 percent or as high as about 25 percent by weight of the complete alkyd resin can be used. However, as the proportions of the polyalkylene glycol increases, the water-resistance of the product progressively decreases. Modifying the alkyd resin with a polyalkylene polyol as contemplated by the present invention produces a stability in the water-based coating composition which will permit storage up to several months without any deleterious effects.

To prepare compositions suitable for use as baking enamels, the novel alkyd resins of the present invention are combined with a compatible, water-soluble, lower alkanol modified amine-aldehyde resin in accordance with conventional procedures. Amine-aldehyde resins useful in the present invention broadly are obtained by the condensation of an aldehyde, particularly formaldehyde with urea or an amino 1,3,5-triazine having at least two amino hydrogen atoms per mol of the triazine or mixtures thereof. While conventional urea-aldehyde or triazine-aldehyde resins are useful in the present invention, it has been discovered that particularly good results are obtained by using an amino resin comprising the condensation product of an aldehyde and a mixture of urea and a triazine compound specified above. An amino resin which comprises a mixture of urea and triazine compound imparts both flexibility and hardness to the baking enamel whereas a urea-aldehyde resin tends to be too soft and the triazine-aldehyde resin is too brittle.

As indicated above, the triazine compounds useful in the present invention are broadly defined as an amino 1,3,5-triazine having at least two amino hydrogen atoms per mole of triazine. Specific examples of these triazines include melamine, amino-cyanidine, diamino-cyanidine, 2-phenyl-4,6-diamino-1,3,5-triazine, 2-aceto-4,6-diamino-1,3,5-triazine, 2-chloro-4,6-diamino-1,3,5-triazine, 2-hydroxy-4,6-diamino - 1,3,5-triazine, 2-methyl-4,6-diamino-1,3,5-triazine, 4-methyl-4-aceto-2,6-diamino-1,3,5-triazine, 2,4-diphenyl, 6-amino-1,3,5-triazine and the like. Because it is readily obtainable and relatively inexpensive, melamine is preferred for use in the present invention.

The water-soluble urea-aminotriazine-aldehyde resin of the present invention is obtained by heating a mixture of urea, an aminotriazine and an aldehyde, preferably formaldehyde to a temperature of about 50° C. to 90° C. and holding at that temperature until a clear solution is formed and then adding to the mixture an acidic catalyst such as oxalic acid dihydrate which is in solution with a lower alcohol. Any lower alcohol such as methanol or ethanol may be used. After refluxing at a temperature of about 70° C. for 60 minutes, the mixture is then cooled to about 50° C., and after the pH is adjusted to about 9.2, distilled at reduced pressure until the concentration of resinous solids is at least about 60 percent. The solution is then filtered with a filtering aid, such as "Filter Cel" which comprises pure diatomaceous silica and is manufactured by Johns-Manville Corp. The final resinous product contains from 50 to 60 percent solids and has a viscosity of C+ to I+ as measured by a Gardner bubble viscometer.

Normally, the amino resin of the present invention is formulated such that triazine component thereof contributes from 30 to 70 percent of the total functional amino groups present and preferably 50 percent. The amino resin is also formulated so that the molar ratio of formaldehyde (HCHO) to amino groups (NH$_2$) ranges from about 1.0 to 1 to about 3.0 to 1 and preferably about 2.3 to 1. Also, the ratio of alcohol hydroxyl groups (OH) to amino groups (NH$_2$) ranges from 3.3 to 1 to about 8 to 1 and preferably is about 6.3 to 1. Under these conditions a very stable, methylated urea-aminotriazine-aldehyde resin is obtained.

To prepare a water-thinned baking enamel in accordance with the present invention, an alkyd resin and an amine-aldehyde resin as described hereinabove are admixed and thinned with water to a solids content of from about 40 to 50 percent. The relative proportions of alkyd resin and amino resin may vary depending on the degree of hardness and flexibility desired in the ultimate films or coatings. By using urea in combination with the amino-triazine compound in forming the amino resin it is possible to use increased amounts of the amino resin with the alkyd resin thus increasing hardness and still retain an acceptable degree of flexibility in the ultimate films or coatings. For the optimum combination of film properties, the relative proportions of alkyd resin and amine resin in the final product ranges from about 70 to 85 percent and 30 to 15 percent, respectively, these percentages being based on the total non-volatile weight of the two resinous components. However, it is to be understood that other proportions may be utilized; for example, the alkyd resin may be present in an amount as high as 90 percent or higher. Similarly, it is possible to use the amino resin in an amount as high as 40 percent or higher. As would be expected, a high percentage of alkyd resin results in a softer more flexible film while a high percentage of amino resin produces a very hard, but somewhat brittle film.

In preparing the coating compositions described herein, it is desirable to add a basic material, preferably a volatile amine such as, for example, trimethylamine, triethylamine, dimethylethanolamine, and the like which aids in solubilizing the mixture of alkyd resin and water. This basic material is added in quantities sufficient to adjust the pH to about 7 to 9.5.

Other modifying agents may also be added in formulating the water-thinned baking enamel without departing from the scope and spirit of this invention. For example, a diol such as ethylene glycol, propylene glycol, butylene glycols, 2-methylpentanediol-2,4, hexylene glycol and the like may be added to improve the stability of the final composition. Likewise, small quantities of well-known surface-active agents which normally contain mixtures of various alcohols, diols, ethers and ketones may improve the stability of the final composition. An example of such an agent is "Surfynol" T.G. which is a mixture of ditertiary acetylenic glycol, an alkyl phenyl ether of polyethylene glycol and ethylene glycol. Addition of these various modifying agents may produce refinements in the final composition which will increase the stability of the final product. The modifies are added in the smallest quantities possible which produce the desired refinement since the presence of larger amounts of these modifiers in the final product has an adverse effect on the physical properties of ultimate films or coatings. The modifiers discussed above may be added prior to or during pigmentation as desired. Pigments may be added in accordance with conventional procedures.

The following Examples 1–16 illustrate in detail the preparation of the novel alkyd resins, the amino resins and the water-thinned coating compositions containing a mixture of these resins in accordance with the present invention. These examples are merely illustrative and the present invention is not intended to be confined to any limitations contained therein.

*Example 1*

A water-soluble oil-modified alkyd resin was prepared from the following ingredients:

| | Parts by weight |
|---|---|
| Coconut oil | 248 |
| Pentaerythritol | 123 |
| Sodium methoxide | 0.4 |
| Phthalic anhydride | 442 |
| Maleic anhydride | 7 |
| Propylene glycol | 67 |
| Dow polyglycol 15–100 [1] | 112 |

[1] Dow polyglycol 15–100 is the addition product of equal mols of ethylene oxide and propylene oxide with glycerol, said product having an average molecular weight of 1100.

To a kettle provided with a stirrer was added the refined cocoanut oil. While bubbling a continuous stream of CO$_2$ through the oil the temperature was raised to 180° C., at which temperature the sodium methoxide (a catalyst) and 64 parts of the pentaerythritol were added. The temperature was then increased to 220° C. and held until a mixture of 1 part product and 1½ parts of methyl alcohol showed no insolubility (about 29 minutes). The temperature of the reaction product was then lowered to 180° C. at which time the remaining pentaerythritol, phthalic anhydride, maleic anhydride, propylene glycol and Dow polyglycol 15–100 were added. The temperature was gradually raised to 190° C. and held at this temperature until an acid number of 65–70 and a viscosity (Gardner bubble viscometer) of U (50% solids in xylene) was obtained. The resin was cooled quickly to room temperature and allowed to age for 24 hours before solubilizing.

*Example 2*

A water-soluble, oil-modified alkyd resin was prepared from the following ingredients:

| | Parts by weight |
|---|---|
| Soya bean oil | 298 |
| Pentaerythritol | 114 |
| Soduim methoxide | 0.4 |
| Phthalic anhydride | 414 |
| Maleic anhydride | 6 |
| Propylene glycol | 63 |
| Dow polyglycol 15–100 | 105 |

In a manner similar to that described in Example 1 the refined soya bean oil was heated to 180° C. while sparging with CO$_2$. At that temperature 59 parts of the pentaarythritol and the sodium methoxide were added and the temperature then increased to 220° C. and held until a mixture of 1 part product and 1½ parts methyl alcohol showed no insolubility (about 15 minutes). The temperature was then lowered to 180° C. at which time the remaining pentaerythritol, phthalic anhydride, maleic anhydride, propylene glycol and Dow polyglycol 15–100 were added. The temperature was gradually raised to 190° C. and held at this tempeature until an acid number of 65–70 and a viscosity (Gardner bubble viscometer) of M (50% solids in xylene) was obtained. The resin was cooled quickly to room temperature and allowed to age for 24 hours before preparing an aqueous solution.

*Example 3*

A water-soluble, oil modified alkyd resin was prepared as follows:

| | Parts by weight |
|---|---|
| Pelargonic acid | 234 |
| Glycerol | 46 |
| Pentaerythritol | 126 |
| Propylene glycol | 69 |
| Phthalic anhydride | 384 |
| Trimellitic anhydride | 54 |
| Dow polyglycol 15–100 | 115 |

The above ingredients were added to a kettle provided with a stirrer. While bubbling a continuous stream of CO$_2$ through the mixture the temperature was raised to 180° C. and held until an acid number of 65–70 and a viscosity (Gardner bubble viscometer) of $Z_6$ (70% solids in xylene) was obtained. The resin was cooled quickly to room temperature and allowed to age for 24 hours before solubilization.

*Example 4*

A water-soluble, oil-modified alkyd resin was prepared as followed:

| | Parts by weight |
|---|---|
| Palargonic acid | 117 |
| Neofat 16 [1] | 117 |
| Glycerol | 46 |
| Pentaerythritol | 126 |
| Propylene glycol | 69 |
| Phthalic anhydride | 384 |
| Trimellitic anhydride | 54 |
| Dow polyglycol 15–100 | 115 |

[1] Neofat 16 is composed of pure palmitic acid.

In a manner similar to that described in Example 3 the above ingredients were added to a kettle provided with a stirrer and the temperature was slowly raised to 180° C. until an acid number of 65–70 and a viscosity (Gardner bubble viscometer) of W (50% solids in xylene) was obtained. The resin was cooled quickly to room temperature and aged for 24 hours before solubilization.

*Example 5*

A water-soluble, oil-modified alkyd resin was prepared from the following ingredients:

| | Parts by weight |
|---|---|
| Cocoanut oil | 281 |
| Pentaerythritol | 139 |
| Sodium methoxide | 0.5 |
| Phthalic anhydride | 424 |
| Propylene glycol | 76 |
| Trimellitic anhydride | 60 |
| Dow polyglycol 15–100 | 127 |

In a manner similar to that described in Example 1 the refined cocoanut oil was heated to 180° C. while sparging with $CO_2$. At that temperature 87 parts of the pentaerythritol and the sodium methoxide were added and the temperature then increased to 220° C. and held until a mixture of 1 part product and 1½ parts methyl alcohol showed no insolubility (about 25 minutes). The temperature was then lowered to 180° C. at which time the remaining pentaerythritol, phthalic anhydride, Dow polyglycol 15–100, propylene glycol and trimellitic anhydride were added. The temperature was gradually raised to 190° C. and held 6–7 hours at this tempearture until an acid number of 77 was obtained. The resin was poured into cans and cooled to room temperature slowly. The final acid number of the cold resin was 65.5 and the viscosity (70% solids in xylene, Gardner bubble viscometer) was $Z_6$.

*Example 6*

A water-soluble, oil-modified alkyd resin was prepared from the following ingredients:

| | Parts by weight |
|---|---|
| Soya bean oil | 361 |
| Pentaerythritol | 139 |
| Sodium methoxide | 0.5 |
| Propylene glycol | 76 |
| Phthalic anhydride | 424 |
| Trimellitic anhydride | 60 |
| Dow polyglycol 15–100 | 127 |

In a manner similar to that described in Example 1, the refined soya bean oil was heated to 180° C. while sparging with $CO_2$. At that temperature 87 parts of the pentaerythritol and the sodium methoxide were added and the temperature was then increased to 220° C. and held until a mixture of 1 part product and 1½ parts methyl alcohol showed no insolubility (about 15 minutes). The temperature was then lowered to 180° C. at which time the remaining pentaerythritol, Dow polyglycol 15–100 propylene glycol, phthalic anhydride and trimellitic anhydride were added. The temperature was gradually raised to 190° C. until an acid number of 75.5 was obtained. Total processing time was about 5 hours. The resin was poured into tin cans and cooled to room temperature gradually. Final acid number of cold resin was 65.6 and the viscosity (Gardner bubble viscometer, 50% solids in xylene) was U.

*Example 7*

A water-soluble, oil-modified alkyd resin was prepared from the following ingredients:

| | Parts by weight |
|---|---|
| Cocoanut oil | 983.5 |
| Pentaerythritol | 486.5 |
| Sodium methoxide | 1.75 |
| Propylene glycol | 266 |
| Phthalic anhydride | 1484 |
| Trimellitic anhydride | 210 |
| Dow polyglycol 15–200 [1] | 444.5 |

[1] Dow polyglycol 15–200 is a polymeric composition derived in the same manner as Dow polyglycol 15–100 and having an average molecular weight of 2600.

In a manner similar to that described in Example 1 the cocoanut oil was heated to 180° C. while sparging with $CO_2$. At this temperature 304.5 parts of the pentaerythritol and the sodium methoxide were added and the temperature then increased to 220° C. and held until a mixture of 1 part product and 1½ parts methanol showed no insolubility (about 35 minutes). The temperature was then lowered to 180° C. at which time the remaining pentaerythritol, propylene glycol, Dow polyglycol 15–200, phthalic anhydride and trimellitic anhydride were added. The temperature was gradually increased to 190° C. and held at this temperature until an acid number of 67 and a viscosity of $Z_4$ (70% solids in xylene, Gardner bubble viscometer) was obtained. The processing requiring about 7 hours. The resin was poured into a can and cooled to room temperature. The physical properties of the cold resin included an acid number of 66.8 and a viscosity of $Z_6$ (70% solids in xylene, Gardner bubble viscometer).

*Example 8*

To a stirred mixture of 104.16 parts of 55.2% formaldehyde and 51.24 parts water adjusted to a pH of 8.2 with 25% NaOH solution and heated to 50° C., was added 12.32 parts urea and 17.23 parts melamine. The temperature was increased to 70° C. and held for one hour. To this mixture was added 164.2 parts methanol and a catalyst comprising 0.26 part oxalic acid (dihydrate). The mixture was then refluxed at 70° C. for one hour and after which it was cooled to 50° C. The pH was adjusted to 9.2 with 25% NaOH solution. Excess methanol and some water were removed at reduced pressures with the temperature ranging from 44–47° C. until a solids content of about 60% was obtained. With the aid of "Filter-Cel" the solution was filtered. The filtered solution contained 52.1% solids and had a viscosity of C+ (Gardner bubble viscometer).

*Example 9*

Another run similar to Example 8 was made but with final solids of 60.9% and a viscosity of I+ (Gardner bubble viscometer).

*Example 10*

A water-thinned baking enamel solution was prepared by dissolving 650 parts of the alkyd resin of Example 1 in 627 parts water with the aid of 88 parts triethylamine, 82.5 parts 2-methylpentanediol-2,4 and 127 parts "Surfynol" TG. To this mixture was added 535 parts of the amine resin of Example 8. The resulting solution was clear and stable and had a pH of 8.4, viscosity of V (Gardner bubble viscometer) and a color of 1 Hellige.

Films prepared from this solution with a 3 mils doctor blade and baked at 300° F. for 30 minutes were clear, hard, flexible and exhibited good resistance to water and 5% solutions of alkali and acetic acid.

*Example 11*

A water-thinned baking enamel was prepared as in Example 10 by forming a solution of 650 parts of the alkyd resin of Example 2, 627 parts water, 535 parts of the amine resin of Example 8, 88 parts triethylamine, 82.5 parts 2-methylpentanediol-2,4 and 82.5 parts "Surfynol" TG. The resulting solution was clear and stable and had a pH of 8.9, a viscosity of W (Gardner bubble viscometer) and a color of 3 Hellige. Films prepared from this solution with a 3 mils doctor blade and baked at 300° F. for 30 minutes were clear, hard, flexible and exhibited good resistance to water and 5 percent solutions of alkali and acetic acid.

*Example 12*

A water-thinned baking enamel was prepared as in Example 10 by forming a solution of 200 parts of the alkyd resin of Example 3, 193 parts water, 165 parts of the amine resin of Example 8, 27.2 parts triethylamine, 25.4 parts 2-methylpentanediol-2,4 and 25.4 parts "Surfynol" TG. The resulting stable solution had a pH of 9.0, viscosity of X (Gardner bubble viscometer) and a color of less than 1 Hellige. Films of this solution prepared with a 3 mils doctor blade and baked at 300° F. for 30 minutes were clear, hard, flexible and exhibited good resistance to water and 5 percent solutions of alkali and acetic acid.

*Example 13*

A water-thinned baking enamel was prepared as in Example 10 by forming a solution of 200 parts of the alkyd resin of Example 4, 193 parts of water, 165 parts of the amine resin of Example 8, 27.2 parts of triethylamine, 25.4 parts 2-methylpentanediol-2,4 and 25.4 parts of "Surfynol" TG. The resulting stable solution had a pH of 8.1, viscosity of $Z_1$ (Gardener bubble viscometer) and a color of 1 Hellige. Films of this solution prepared with a 3 mils doctor blade and baked at 300° F. for 30 minutes were clear, hard, flexible and possessed good resistance to water and 5 percent solutions of alkali and acetic acid.

*Example 14*

A water-thinned baking enamel was prepared as in Example 10 by forming a solution of 650 parts of the alkyd resin of Example 5, 627 parts water, 535 parts of the amine resin of Example 8, 88 parts triethylamine, 82.5 parts 2-methylpentanediol-2,4 and 82.5 parts "Surfynol" TG. The resulting stable solution had a pH of 8.9, viscosity of Y (Gardner bubble viscometer) and a color of 3 Hellige. Films of this solution prepared with a 3 mils doctor blade and baked at 300° F. for 30 minutes were clear, hard, flexible and exhibited good resistance to water and to 5 percent solutions of alkali and acetic acid.

*Example 15*

A water-thinned baking enamel was prepared as in Example 10 by forming a solution containing 200 parts of the alkyd resin of Example 6, 20.9 parts water, 16.5 parts of the amine resin of Example 8, 26.6 parts triethylamine, 17.2 parts 2-methylpentanediol-2,4 and 17.2 parts "Surfynol" TG. The resulting stable solution had a pH of 8.2 and a viscosity of Z (Gardner bubble viscometer). Films of this solution, prepared with a 3 mils doctor blade and baked at 300° F. for 30 minutes were clear, hard, flexible and possessed fair resistance to water and a 5% sodium hydroxide solution and good resistance to a 5% acetic acid solution.

*Example 16*

A water-thinned baking enamel was prepared as in Example 10 by forming a solution containing 656 parts of the alkyd resin for Example 7, 632 parts water, 460 parts of the amine resin of Example 9, 88 parts triethylamine, 82 parts 2-methylpentanediol-2,4 and 82 parts "Surfynol" TG. The resulting clear, stable solution had a pH of 8.9, viscosity of Y (Gardner bubble viscometer) and a color of 2 Hellige. Films of this solution prepared with a 3 mils doctor blade and baked at 300° F. for 30 minutes were clear, hard, flexible and had good resistance to water and a 5% acetic acid solution and fair resistance to a 5% sodium hydroxide solution.

*Example 17*

To compare stability of water-based coating compositions of the present invention with heretofore known water-based coating compositions containing alkyd resins, an oil-modified, polyethylene glycol-modified alkyd resin was prepared by heating 228.6 parts cocoanut oil in a vessel provided with a stirrer to 190° C. while sparging with $CO_2$. At that temperature 71.1 parts pentaerythritol and 0.36 part sodium methoxide were added and the temperature was then increased to 230° C. and held until a mixture of 1 part product and 1½ parts methanol showed no insolubility (about 25 minutes). The temperature was then lowered to 180° C. at which time 42.3 parts pentaerythritol, 102.6 parts "Carbowax" 1500 which is polyethylene glycol having an average molecular weight of from 500–600, 62.1 parts propylene glycol, 344.7 parts phthalic anhydride and 48.6 parts trimellitic anhydride were added. The temperature was gradually raised to 190° C. and held at this temperature until and acid number of 80.6 and a viscosity of $Z_2$ (70% in xylene, Gardner bubble viscometer) was obtained. The resin was then cooled to room temperature wherein the resin had an acid number of 74, viscosity of $Z_4^{3/4}$ (70% solids in xylene, Gardner bubble viscometer) and a color of 6 Hellige.

A coating composition was prepared using this polyethylene glycol-modified resin by forming a water dispersion containing 328 parts of said resin, 316 parts water, 44 parts triethylamine, 41 parts 2-methylpentanediol-2,4, 41 parts "Surfynol" TG and 230 parts of the amino resin of Example 9. The resulting dispersion had a viscosity of $U^{3/4}$ (Gardner bubble viscometer, a pH of 9.4 and a color of 4 Hellige.

The stability of the prior art product produced in Example 17 and a product of the present invention as prepared in Example 16 was tested by aging the respective compositions at a temperature of 140° F. for sixteen hours. The comparative results of this accelerated aging are shown in the following table:

| Composition | Viscosity before aging | Viscosity after aging |
| --- | --- | --- |
| Ex. 16 | Y | X |
| Ex. 17 | $U^{3/4}$ | $R^{1/4}$ |

The comparatively small decrease in viscosity of the Example 16 composition as compared to the Example 17 composition clearly demonstrates the improved stability of water-based coating compositions containing an oil-modified alkyd resin which is further modified by a polyalkylene polyol of the type specified herein. In addition to the improved stability of the coating compositions of this invention when stored in cans, films made therefrom are superior in flexibility, hardness, water and alkali resistance and appearance.

The water-thinned coating compositions described herein may be applied by any conventional method such as spraying, brushing, flowing or dipping. These compositions are particularly useful as baking enamels and dry rapidly to a hard, glossy film in a period of about 30 minutes when baked at a temperature of from 250 to 300° F. Because of their excellent adhesion to metal surfaces, these baking enamels are particularly useful as finishes for automobiles, appliances and the like.

I claim:

1. A water-soluble, oil-modified alkyd resin which comprises the esterification product of:
    (a) a compound selected from the group consisting of glyceride oils and glyceride oil fatty acids,
    (b) a compound selected from the group consisting of polycarboxylic acids, polycarboxylic anhydrides and mixtures thereof,
    (c) a polyhydric alcohol and
    (d) a polyalkylene polyol which is the addition product of an alkylene oxide and an aliphatic polyol having at least 3 hydroxyl groups, said polyalkylene polyol having a molecular weight from 1100 to 2600,
said alkyd resin having an acid number of from about 40 to about 95.

2. An alkyd resin as defined in claim 1 wherein the polyalkylene polyol is the addition product of ethylene oxide and propylene oxide in approximately equimolar portions to glycerol.

3. An alkyd resin as defined in claim 1 wherein (b) comprises phthalic anhydride.

4. An alkyd resin as defined in claim 1 wherein (c) comprises pentaerythritol and propylene glycol in a molar ratio of from about 1 to 1 to about 4 to 1.

5. A composition suitable for use as a baking enamel comprising an aqueous solution containing
    (A) from about 60 to 90 percent by weight of the total non-volatiles present of an oil-modified alkyd resin comprising the reaction product of:
        (a) a compound selected from the group consisting of glyceride oils and glyceride oil fatty acid,
        (b) a compound selected from the group consisting of polycarboxylic acids, polycarboxylic anhydrides and mixtures thereof,
        (c) a polyhydric alcohol and
        (d) a polyalkylene polyol which is the addition product of an alkylene oxide and an aliphatic polyol having at least 3 hydroxyl groups, said polyalkylene polyol having a molecular weight from 1100 to 2600,
    said alkyd resin having an acid number from about 60 to about 75, and
    (B) from about 10 to 40 percent by weight of the total non-volatiles present of a lower alkanol-modified amine-aldehyde resin.

6. A composition as defined in claim 5 wherein (b) comprises phthalic anhydride.

7. A composition as defined in claim 5 wherein (c) comprises pentaerythritol and propylene glycol in a molar ratio of from about 1 to 1 to about 4 to 1.

8. A composition as defined in claim 5 wherein the amine-aldehyde resin is a urea-melamine-formaldehyde resin.

9. A composition as defined by claim 5 wherein the amine-aldehyde resin comprises the reaction product of:
    (1) urea,
    (2) an amino-1,3,5-triazine,
    (3) an aldehyde and
    (4) a lower alcohol.

10. A composition as defined in claim 9 wherein the polyalkylene polyol is the addition product of ethylene oxide and propylene oxide in approximately equimolar portions to glycerol.

References Cited by the Examiner

UNITED STATES PATENTS

| | | | |
|---|---|---|---|
| 2,634,245 | 4/1953 | Arndt | 260—22 |
| 2,813,841 | 11/1957 | Parker | 260—22 |
| 2,973,331 | 2/1961 | Kraft | 260—22 |
| 2,978,425 | 4/1961 | Culbertson | 260—21 |
| 3,001,961 | 9/1961 | Armitage | 260—22 |
| 3,077,459 | 2/1963 | Hershey | 260—22 |
| 3,133,032 | 5/1964 | Jen | 260—21 |
| 3,177,167 | 4/1965 | Skreckoski | 260—18 |
| 3,183,109 | 5/1965 | Neumann | 260—18 |
| 3,223,659 | 12/1965 | Curtice | 260—22 |

LEON J. BERCOVITZ, *Primary Examiner.*

F. McKELVEY, *Assistant Examiner.*